US007703301B2

(12) United States Patent (10) Patent No.: US 7,703,301 B2
Loibl et al. (45) Date of Patent: Apr. 27, 2010

(54) RAPID FLUID COOLING SYSTEM AND REFRIGERATION DEVICE HAVING SAME

(75) Inventors: Gregory H. Loibl, Hyde Park, NY (US); George Sidebotham, Babylon, NY (US)

(73) Assignee: The Cooper Union for the Advancement of Science and Art, New York, NY (US)

( * ) Notice: Subject to any disclaimer, the term of this patent is extended or adjusted under 35 U.S.C. 154(b) by 0 days.

(21) Appl. No.: 11/981,085

(22) Filed: Oct. 31, 2007

(65) Prior Publication Data

US 2008/0134695 A1 Jun. 12, 2008

Related U.S. Application Data

(63) Continuation of application No. 11/258,651, filed on Oct. 25, 2005, which is a continuation-in-part of application No. 10/731,264, filed on Dec. 9, 2003, now abandoned, which is a continuation of application No. 10/086,285, filed on Mar. 1, 2002, now Pat. No. 6,662,574.

(60) Provisional application No. 60/272,510, filed on Mar. 1, 2001.

(51) Int. Cl.
*F25D 17/02* (2006.01)

(52) U.S. Cl. ............... 62/376; 62/63; 62/64; 62/373; 62/374; 62/375; 62/377; 62/378; 62/434; 62/441

(58) Field of Classification Search .............. 62/63, 62/64, 373–376, 378, 377, 441, 434
See application file for complete search history.

(56) References Cited

U.S. PATENT DOCUMENTS

| 2,575,094 | A | * | 11/1951 | Chamberlain ............ 62/375 |
| 2,655,007 | A | | 10/1953 | Lazar |
| 2,794,326 | A | | 6/1957 | Mencacci |
| 3,083,547 | A | | 4/1963 | Stevens et al. |
| 3,283,523 | A | | 11/1966 | Long |
| 3,316,734 | A | | 5/1967 | Crane, Jr. |
| 4,139,992 | A | | 2/1979 | Fraser |
| 4,164,851 | A | | 8/1979 | Bryant |
| 4,304,105 | A | | 12/1981 | West |
| 4,531,382 | A | | 7/1985 | Butler et al. |
| 4,549,409 | A | | 10/1985 | Smith |

(Continued)

FOREIGN PATENT DOCUMENTS

DE 19910181 9/2000

(Continued)

*Primary Examiner*—Frantz F Jules
*Assistant Examiner*—Azim Rahim
(74) *Attorney, Agent, or Firm*—Pryor Cashman LLP; Barry E. Negrin

(57) ABSTRACT

A system for rapidly cooling a liquid in a container within a refrigerator-freezer or freezer is provided. The housing has a space for receiving a container, and a rotator rotates the container about an axis. While the container is rotating, a sprayer sprays chilled cooling medium on the container in the housing. A reservoir stores the cooling medium when the system is not being used and maintains the cooling medium at a given temperature. At least one chilling surface is preferably provided over which the cooling medium flows and where ice may be stored. A recirculator such as a pump recirculates the cooling medium throughout the system.

19 Claims, 15 Drawing Sheets

U.S. PATENT DOCUMENTS

| | | |
|---|---|---|
| 4,580,405 A | 4/1986 | Cretzmeyer, III |
| 4,628,703 A | 12/1986 | Kim |
| 4,711,099 A | 12/1987 | Polan et al. |
| 4,736,593 A | 4/1988 | Williams |
| 4,803,850 A | 2/1989 | Josten et al. |
| 4,813,243 A | 3/1989 | Woods et al. |
| 4,825,665 A | 5/1989 | Micallef |
| 5,282,368 A | 2/1994 | Ordoukhanian |
| 5,505,054 A | 4/1996 | Loibl et al. |
| 5,887,446 A * | 3/1999 | Lee ............... 62/441 |
| 5,896,748 A * | 4/1999 | Park ............... 62/179 |
| 5,931,010 A * | 8/1999 | Kim ............... 62/157 |
| 6,351,967 B1 * | 3/2002 | Adachi et al. ......... 62/441 |

FOREIGN PATENT DOCUMENTS

| | | |
|---|---|---|
| EP | 278884 | 8/1988 |
| GB | 1537821 | 1/1979 |
| WO | 97/35155 | 9/1997 |

* cited by examiner

RAPID FLUID COOLING SYSTEM AND REFRIGERATION DEVICE HAVING SAME

RELATED APPLICATIONS

This is a continuation of U.S. patent application Ser. No. 11/258,651, filed Oct. 25, 2005, pending, which is a continuation-in-part of U.S. patent application Ser. No. 10/731,264, filed Dec. 9, 2003, abandoned, which is a continuation of U.S. patent application Ser. No. 10/086,285, filed Mar. 1, 2002, now U.S. Pat. No. 6,662,574, which claims domestic priority from U.S. Provisional Patent Application No. 60/272,510 filed Mar. 1, 2001. All of the teachings of the foregoing applications are incorporated by reference herein.

BACKGROUND OF THE INVENTION

1. Field of the Invention

This invention relates to devices for use in the rapid cooling of fluids in various containers of differing geometry, and more particularly to such devices in communication with freezer units, refrigerator-freezers, and the like.

2. Description of the Related Art

Various devices and methods have been employed in cooling beverages or fluids in containers from room temperature to consumption-pleasing low temperatures (or other desirable storage-type low temperatures), generally of about 5° C. The most common method is the use of commercial or household refrigerators or freezer units into which the beverage containers are statically placed. Air inside the conventional refrigerator or freezer is cooled, and the air cools the beverages or fluids. While effective, such cooling means entails the utilization of massive refrigerator and freezer space (especially in commercial establishments) which is costly and is at a premium, particularly when freezer or refrigerator space is generally required for other food storage purposes.

In addition to occupying a lot of space, these conventional refrigeration and freezer units require inordinate initial periods of time to cool a liquid such as a beverage, for example, from room temperature (20°-25° C.) to the desired 5° C., approximately an hour to several hours. If reasonably immediate consumption is required, such as at point of sale, at parties, or on very hot days, this time delay for cooling is unacceptable. Also, many individuals prefer beverages at temperatures colder than a conventional refrigerator can provide, e.g., 1-2° C. (or even at colder temperatures, as beer can be chilled down to −5° C.).

Accordingly, quick cooling devices have been developed specifically for use with beverage containers. Some of these devices, while generally effective in reducing the time for cooling beverages, nevertheless still require a minimum of about five minutes for the cooling of a standard 12 oz aluminum beverage can, still an inordinate amount of waiting time for a customer; this cooling lag time increases for larger containers, such as 16 oz or 20 oz soda or beer bottles and roughly 25 oz wine bottles.

Existing cooling devices operate on one of two general methods involving heat transfer. A first method involves cooling with ice such as embodied in a commercial device known as the Chill Wizzard and as described in U.S. Pat. No. 4,580,405 to Cretemeyer, III. This device provides for placement of a beverage can on a bed of ice to effect heat transfer and cooling. Since only a portion of the container is in contact with the ice, the container is rotated against the ice. In order to rotate the device, a suction cup connected to the spindle of a motor is attached to the bottom of the can. In addition, in order to maintain heat transfer-contact with the ice, the device provides for a constant mechanically-exerted contact pressure of the container against the ice to compensate for the melting and consequent reduction of height of the ice. Since ice can have substantially lower temperatures than the desired drinking temperature, heat exchange and beverage temperature lowering is facilitated and hastened. However, the Chill Wizzard device can only chill 12 oz cans and is unable to accommodate a variety of different-sized or -shaped containers. Further problems with this method are discussed below.

A second, less effective method involves conveying or placing the beverage containers into a cold water or bath. Because the container is stationary, cooling times for this method have been substantially longer than that for methods which utilize horizontal rotation of the container. This is also true because the water is stationary as well.

Another commercial device is the Vin Chilla (and similar products made by Breville and Salton), a bucket-shaped device for cooling wine bottles. A bottle is placed upright in the bucket and ice and water are added thereto. The device swirls the water around the bottle. Although the Vin Chilla commercial literature claims it can chill wine to a drinkable temperature in about 4 minutes, this period is only valid for cooling red wines, which are to be consumed at only 1-2 degrees below room temperature. A white wine requires up to 20 minutes of cooling to be brought to a desirable temperature, e.g., 5° C.

Despite its effectiveness in cooling (because of its low temperatures relative to water), the use of ice as a direct cooling medium can however be detrimental in certain common uses. When used for cooling carbonated beverages, particularly when such cooling is not carefully monitored, freezing of the beverage, with untoward consequences (i.e., the rupturing of the container and spilling of its contents), is possible. Specifically, the temperature of ice is rarely at 0° C. and is usually significantly lower. As a result, if the ice temperature is sufficiently low, freezing of the beverage within the container is possible, especially with extended cooling times. Since such containers are closed, it is difficult if not impossible to monitor temperature and phase conditions of the beverage during the cooling process to stop the process prior to any freezing. Under these conditions, with excessive cooling, partially frozen carbonated beverages will erupt when the container is opened. Though cold water is not subject to this detrimental effect with carbonated beverages, its use is however not as efficient in effecting the requisite rapid cooling.

One major improvement in this field of endeavor is described in U.S. Pat. No. 5,505,054 to Loibl et al., the same inventors as the instant inventors and which patent is assigned to the same entity to which the instant invention is assigned. Loibl et al. teach an extremely rapid method and device for cooling beverages. One or more beverage containers are rapidly rotated substantially along their respective longitudinal axes while being downwardly sprayed with a cooling water spray, with the water being recycled from a 0° C. ice water bath. The volumetric rate of the water in the water spray is sufficient to form a continuous coating on the rotating container. Rotation of the containers is effected in a horizontal direction, with the containers being nested between adjacent rotating rollers and rotated with a speed of between 200-500 rpm. Standard 12 oz. beverage cans can be cooled thereby from room temperature to a drinking temperature of 5° C. in under one minute. The teachings of the Loibl patent are herein incorporated by reference, particularly col. 2, line 55-col. 5, line 58.

Yet the prior Loibl device, while extremely effective, incorporates a number of spray jets positioned in various locations above the rotating containers and a number of rollers positioned below the containers. It is desirable to simplify this design. Moreover, it is desired to be able to incorporate the basic principles of Loibl '054 within a household refrigerator-freezer or freezer unit. One of the drawbacks of the original Loibl device is that it is a tabletop device or otherwise stand-alone device that requires a replenishible source of ice. It would be advantageous to incorporate the Loibl device into a refrigerator and take advantage of a cooling device that is already present in almost every home.

SUMMARY OF THE INVENTION

It is an object of the present invention to provide a means for the very rapid cooling of liquids such as beverages within containers, with a time period of cooling which is significantly shorter than that of prior art devices which utilize cooling with ice.

It is another object of the present invention to provide a rapid cooling device which is safe, easily manufactured, and appropriate for a fairly unsophisticated consumer/retail market.

It is another object of the present invention to provide a rapid cooling device without the detriment of possible freezing of carbonated beverages.

It is another object of the invention to provide a single, simple-to-use control system for cooling a beverage or other fluid within a container.

It is another object of the invention to provide a rapid cooling system as part of a refrigerator-freezer or -freezer unit.

The above and other objects are fulfilled by the invention, which is an apparatus for rapidly cooling a liquid in a container in a freezer or refrigerator-freezer unit. A housing is provided having a bottom and side walls defining an interior volume adapted to receive a container of liquid. A rotating mechanism is disposed in the housing adapted to rotate a container about the container's longitudinal axis. A source of a cooling medium is provided to cool the container, and a chilling means is provided to chill the cooling medium. When the container is placed within the interior volume, the cooling medium thermally communicates with the container while the rotating mechanism rotates the container.

The chilling means preferably includes at least one ice tray having an inlet receiving the cooling medium, a chilling surface in thermal communication with the freezer compartment and receiving the cooling medium from the inlet, and an outlet allowing the cooling medium to exit the ice tray. Preferably, the ice tray includes a plurality of stages having chilling surfaces disposed one atop another, wherein the cooling medium passes over each of the chilling surfaces one after another. In one embodiment, water is introduced above the top stage and flows downward to a lower stage in a cascading fashion. In another embodiment, water is pumped up from beneath the lowest stage and moves upward over succeeding upper stages.

The inventive apparatus preferably further includes a reservoir for storing the cooling medium and maintaining the cooling medium substantially at a given temperature. In one embodiment, the reservoir preferably has a reservoir inlet communicating with the ice tray outlet and a reservoir outlet communicating to the cooling medium source. The housing empties cooling medium into the ice tray inlet.

Insulation is preferably provided around the various portions of the apparatus. A first section of insulation preferably substantially insulates the housing from the freezer compartment, a second section of insulation preferably substantially insulates the ice tray from ambient air, and a third section of insulation is provided in two parts, a first part that partially insulates the reservoir from the freezer compartment and a second part that partially insulates the reservoir from ambient air. The first and second parts of the third section of insulation are adapted to keep the reservoir substantially as cold as possible without completely freezing the cooling medium.

Turning to some optional specifics of the ice tray, the ice tray further includes a pair of side walls; each of the stages may be attached to one of the side walls in a cantilever manner having a fixed end and a free end. In this embodiment, a free end of a given stage is disposed above a fixed end of the stage immediately therebelow. Preferably, a lip is disposed on the free end of each of the stages. In embodiments in which the cooling medium flows downward via gravity in the ice tray, the lip is a raised lip. In embodiments in which the cooling medium is pumped upward, the lip may be raised or downwardly projecting, or both. Each of the chilling surfaces may be angled away from its respective side wall, particularly in the downward flowing ice tray. Alternatively, each stage may be fixed to both side walls at both ends and provided with through holes which allow the cooling medium to reach the next stage. Posts or small protrusions may preferably project from the chilling surfaces to create turbulence within the fluid flow.

The housing may be disposed on or as a part of the door of the freezer, as may the reservoir and/or the ice tray. At least one fin may be provided projecting into either the ice tray or the reservoir (or both) in thermal communication with the freezer compartment.

The inventive apparatus may employ both ice tray and reservoir, or only a reservoir, or only an ice tray, depending on the thermal properties of the cooling medium, the temperature of the freezer, and a variety of other factors.

The invention also includes a freezer incorporating any of the embodiments of inventive apparatus described above.

The invention also includes an apparatus for rapidly cooling a liquid in a container as part of a domestic cooling device having a compressor and at least two cooling compartments, one compartment being colder than the other warmer compartment. The apparatus includes a housing having an interior volume adapted to receive a container, the housing being disposed in one of the two compartments. A rotating mechanism is disposed in the housing adapted to rotate a container placed in the housing about the container's longitudinal axis. A source of a cooling medium is provided to cool the container in the housing. At least one ice tray is disposed in either cooling compartment having a chilling surface in thermal communication with the colder compartment adapted to chill the cooling medium. The apparatus also preferably includes a reservoir disposed in either compartment and in thermal communication with the colder compartment adapted to substantially maintain the cooling medium at a given temperature. The cooling medium recirculates among the housing, the ice tray, and the reservoir. Preferably, at least one fin projects into the reservoir and is in thermal communication with the colder compartment or, alternatively, directly with the evaporator of the domestic cooling device. Optionally, the ice tray acts as a shelf in its compartment upon which items (such as food) may be placed.

In one embodiment, the housing is disposed in the warmer compartment, and includes a housing outlet. Here, the ice tray may be disposed in the warmer compartment and may include: a fin projecting into the colder compartment; an ice tray inlet communicating with the housing outlet; and an ice tray outlet. In this embodiment, the reservoir includes a reservoir inlet communicating with the ice tray outlet and a reservoir outlet communicating with the cooling medium source in the housing. The ice tray may include baffles, projecting from the chilling surface, adapted to direct flow of the cooling medium across the chilling surface. The baffles encourage the cooling medium to spread substantially over the chilling surface before draining out of the ice tray via the ice tray outlet.

In another embodiment, the housing is disposed in the colder compartment and has a housing outlet (drain). Here, the ice tray may be disposed in the colder compartment and may include: an ice tray outlet in communication with the cooling medium source in the housing; and an ice tray inlet. The reservoir includes a reservoir inlet in communication with the housing outlet and a reservoir outlet in communication with the ice tray inlet. A supplemental ice tray may optionally be disposed between the housing outlet and the reservoir inlet, or in between any of the components in any of the embodiments.

In another embodiment, the housing may again be disposed in the colder compartment and have a housing outlet (drain). Here, the ice tray is disposed in the colder compartment and includes: an ice tray inlet in communication with the housing outlet; and an ice tray outlet. The reservoir includes a reservoir inlet in communication with the ice tray outlet and a reservoir outlet in communication with the cooling medium source in the housing. A supplemental ice tray may optionally be disposed between the reservoir outlet and the cooling medium source in the housing.

In all of the above embodiments, the ice tray may include a plurality of chilling surfaces disposed one atop another, wherein the cooling medium passes over each of the chilling surfaces one after another. As above, the cooling medium may enter via the top of the ice tray and cascade down via gravity, or the cooling medium may be introduced from the bottom of the ice tray and pumped upwards over the various chilling surfaces.

Generally, the invention includes is a system for rapidly cooling a liquid in a container within a refrigerator-freezer or freezer, having: a housing having a space for receiving a container; a rotator adapted to rotate the container; a sprayer adapted to spray chilled cooling medium on the container in the housing; a reservoir adapted to store the cooling medium when the system is not being used and to maintain the cooling medium as a given temperature; and a recirculator adapted to recirculate the cooling medium throughout the system.

The inventive method preferably includes a number of features to accommodate a variety of different containers. For example, the rotation of the container may be selectively disabled to accommodate containers that may not rotate conveniently (e.g., containers with non-round cross-sections, containers with corners, irregular-shaped containers, etc.).

Optionally, the device includes a timing means for showering the containers for a pre-determined time sufficient to effect the requisite cooling. The device may be pre-programmed with a set number of different timing sequences and/or rotational speeds depending on the type of container, the type of liquid/beverage, and the desired temperature of the liquid. The device may include a means for continuing the sequence beyond the predetermined period of time if the user wishes to provide extra cooling or warming for the liquid. Temperature sensors may be provided to monitor the reservoir, the liquid in the container, or both. The container sensors may be contact sensors, infrared sensors, or the like.

The invention may preferably have a drain located at the bottom of the reservoir to enable the system to be drained during cleaning. It may also include an optional inlet line to allow the provision of cooling medium during the initial charge-up, replenishment, and routine cleaning. The invention may also include a timing mechanism that recirculates the cooling medium through the system at certain intervals independent of the consumer and set at predetermined times, based on temperature sensor readings, or based on the time between uses of the system. The invention may also include a sanitizing means such as an ultraviolet light, a chemical in the cooling medium, or another mechanism to sanitize the cooling medium.

DETAILED DESCRIPTION OF THE PREFERRED EMBODIMENTS

Detailed description of the invention will now be provided with reference to FIGS. 1-13. It should be understood that these drawings and this detailed description are exemplary in nature only, and do not serve to limit the scope of the invention, which is defined by the claims appearing hereinbelow.

Figure 1A:
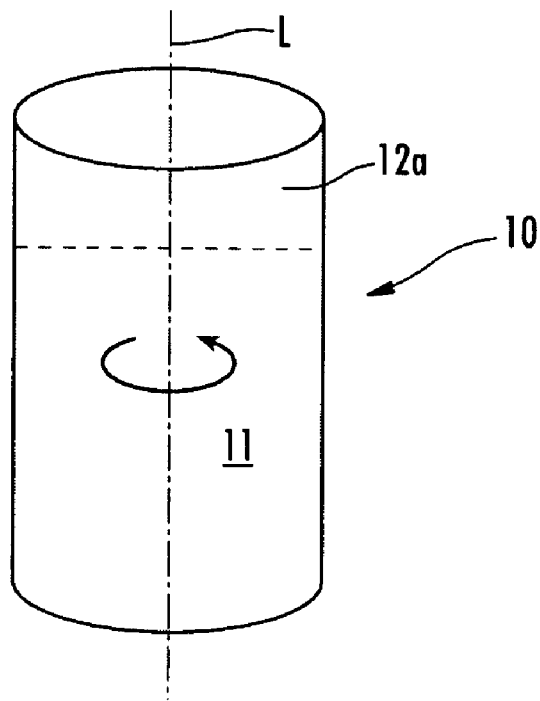
FIGS. 1A and 1B depict a standard beverage container in the upright and horizontal positions, showing the liquid contents level therein in dotted lines.
Figure 1B:
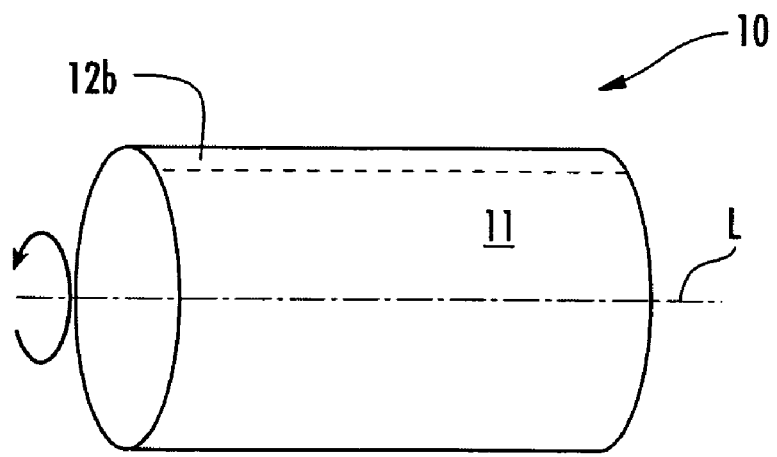

FIGS. 1A and 1B depict a typical 12 ounce beverage container 10 positioned vertically and horizontally respectively. The beverage 11, contained therein is shown with an air space 12A in FIG. 1A and a full can length air space 12B in FIG. 1A. Rotation of the container along its longitudinal axis L, when the container is positioned vertically, results in a rotation of an essentially rigid body with little mixing and extensive cooling times being required. By contrast, the horizontally disposed container 10 in FIG. 1B, when rotated about its longitudinal axis L, results in a high degree of agitation with a high degree of mixing and exchange heat transfer rates.

Figure 2B:
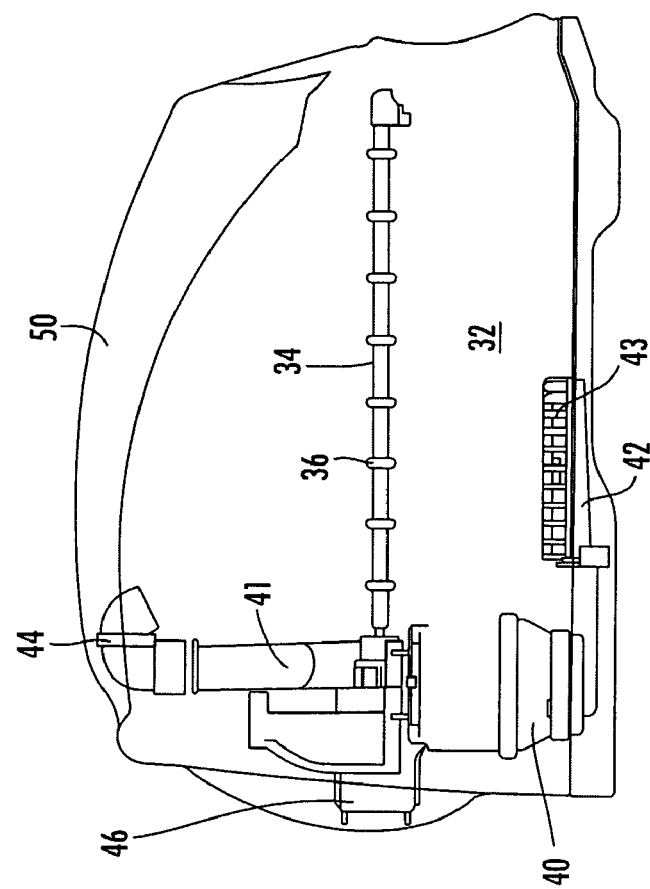
FIGS. 2A-B are rear and side cutaway schematics showing the interior of a previous tabletop embodiment of the invention.
Figure 2A:
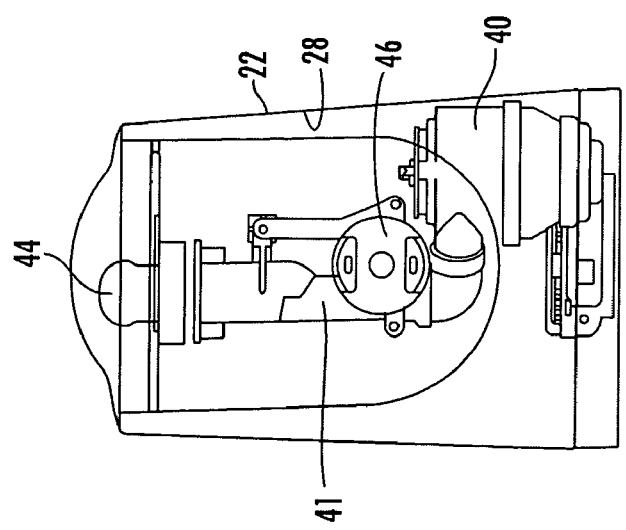

FIGS. 2A-B depict a previous stand-alone or tabletop embodiment of the invention as described, e.g., in U.S. Pat.

No. 6,662,574 to Loibl et al, the instant inventors. Cooling unit 20 has a housing 22 which has an interior volume or reservoir 32 into which an ice water solution is disposed. The housing is preferably made of plastic, however any material can be used. Housing 22 is preferably double-walled, i.e., has a layer of insulation such as air disposed between two layers of housing material. The air layer serves two insulative functions. First, by insulating the exterior from the ice-cold ice water reservoir, a layer of condensation ("sweat") will not form on the exterior of housing 22, an otherwise undesirable occurrence. Second, by insulating the interior from the outside ambient air (which is presumably at room temperature or approximately 25EC), the ice water reservoir 32 remains colder longer because it is absorbing less heat from the environment. Air is an excellent insulator, however other insulation materials may be employed instead of or in addition to air. The two layers also increase the strength of the housing and provide better stability for the system.

Leaving a gap between the two layers of housing material also enables active control of the temperature of the reservoir in that cooling elements may be disposed between the layers in the bottom and/or sidewalls of housing 22. For example, such cooling elements may include standard refrigeration coils.

A container such as soda can 10 is intended to be placed within housing 22; depending on the relative height of the support structure upon which the container rests, the container may not be in direct contact with the ice water solution disposed in reservoir 32, or it may be partially submerged in reservoir 32. As shown in FIG. 2, a drive roller 34 is provided on which the container is to be placed. The drive roller 34 preferably includes several spaced apart contact rings 36 upon which the container is intended to be supported. As mentioned above, contact rings 36 provide for better frictional contact between roller 34 and container 10 than a simple smooth roller would provide, because the same weight of the container is contacting a much smaller surface area (i.e., the ring-container interface is significantly smaller than a smooth roller-container interface). The contact rings also allow water (or other cooling medium) that is sprayed onto the container for cooling (see below) to wrap fully around the container and thus contact a greater surface area of the container, thereby maximizing heat transfer. Further, the gaps between adjacent contact rings provide channels into which water may fall off of the container back into reservoir 32; this channeling effect helps to prevent hydroplaning of the container on the roller, which would otherwise be caused by a thin layer of water getting trapped between the container and a smooth roller. Of course, a roller of uniform profile may also be employed without departing from the invention. It would be desirable to create good frictional contact between the roller and the container in any event.

Since roller 34 is circular in section and the majority of beverage containers are also circular in section, single roller 34 by itself provides insufficient support for a typical container, particularly since roller 34 will be rotating and causing can 10 to rotate. Thus, a plurality of ribs 38 (see FIG. 3) may be formed in one or both of the side walls to provide lateral support for a container to be placed within cooling unit 20. That is, when a container is placed therein, it is supported on the bottom by roller 34 and on the side by ribs 38. Ribs 38 are preferably spaced apart to enable a person to get his/her fingers around the container more easily when removing the container after chilling, and strengthen the wall upon which they are provided.

Figure 2C:
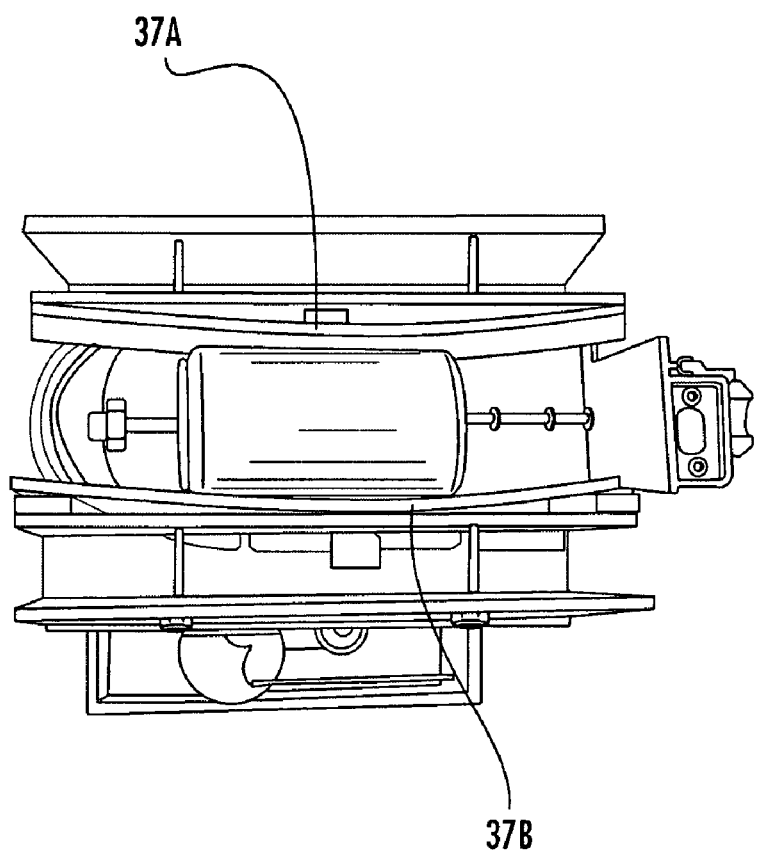
FIG. 2C is a top view showing the interior of an alternate embodiment of a tabletop version of the invention.
Figure 3:
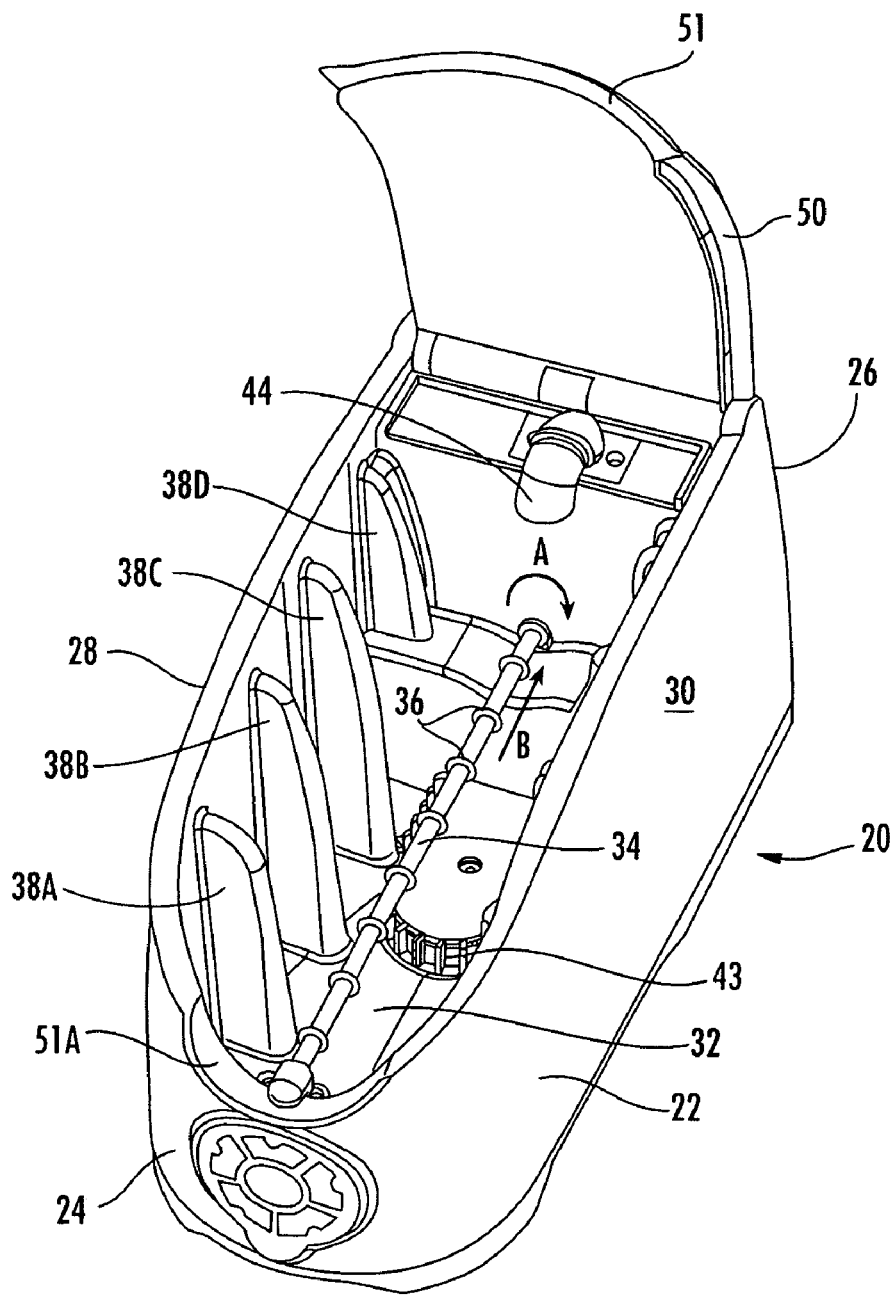
FIG. 3 is a perspective schematic of the previous tabletop embodiment of FIGS. 2A-B.

The ribs also facilitate the addition of ice into reservoir 32 by providing additional clearance between roller 34 and wall 30. Were the ribs not provided, wall 30 would need to be moved to where the innermost portions of ribs 38 are, i.e., inwardly closer to the roller, thereby reducing the sectional area through which ice may be added to the reservoir. As with the contact rings 36, ribs 38 also allow water to flow smoothly entirely around container 10; if a smooth wall were provided, the water sprayed on top of the container would flow to the wall/container interface and stop. The ribs allow the water to flow smoothly around the bottom of the container and then neatly collect back in the reservoir. Ribs 38 are preferred but not required; a flat or curved wall or additional roller(s) could be used to provide support for the container as well. As shown in FIG. 2C, convex wall 37A can be used if the container is rotated in a manner that it is pulling away from the wall. And conversely, concave wall 37B can be used if the container is rotated in a manner that it is pushing into the wall. Both the concave and convex wall will position the container directly at the center of mass. Alternatively, as shown in FIG. 2C, both convex wall 37A and concave wall 37B may be used together for positioning the container. Further, additional support structure may be provided to secure the container and prevent it from falling into the reservoir; for example, a clamp or netting may be provided which keeps the container in contact with roller 34 may be provided in the interior volume of the housing, either attached to a side wall or from the underside of lid 50, for example.

As shown in FIGS. 2A-B, a pump 40 is preferably provided, powered by a power supply (not shown), to send water from the ice water reservoir 32 up through tubing or piping 41 to spray jet or nozzle 44. The floor of housing 22 is preferably angled to cause water in reservoir 32 to collect or pool nearest the pump inlet. In this way, the amount of water required to run the cooling cycle is minimized, thereby allowing a maximum amount of ice to be employed to maximize the amount of heat the ice-water solution can absorb. A grill 43 is provided in front of the intake 42 of pump 40 to minimize air bubbles and large chunks of ice being pulled into the pump.

Spray jet 44 is designed to shower the circumferential surface of a container placed in the cooling unit with ice-cold water so as to cool the contents of the container. Optionally, an additional spray jet may be provided to coat the bottom surface of a container with a separate jet spray. It is preferred to provide a single spray jet for each surface of the container so that the film of water sprayed onto a given surface of the container is smooth and clings to the container; the provision of multiple spray jets for a given surface (i.e., a number of spray jets positioned above the circumferential surface of the container) is not preferred, because the respective jets of water interfere with each other and prevent a smooth film of water from forming over the entire container. A container must therefore be placed within the cooling unit so that the sprayed water from spray jet 44 will substantially contact the container. In the preferred embodiment shown, since spray jet 44 is only provided in the rear of the cooling unit 20, the proper placement of the container is extremely important. Accordingly, ribs 38 are not preferably provided as being identical. Rather, the distance from the drive roller to the outer edge of the ribs 38 preferably varies from front to back; that is, front-most rib 38A is the closest to the roller 34, rib 38B is further than rib 38A, rib 38C is further than rib 38B, and rib 38D is further than rib 38C. As a result, the profile or outer extent of the ribs is not parallel to roller 34 but rather skewed at an angle from parallel to the roller. The angling of the profile of ribs 38 causes the container placed in the cooling unit to be angled with respect to roller 34. As such, the roller 34 causes a corkscrew-like rotation in the container with respect to the roller, and container will travel in the longitudinal direction. If the container is made to rotate as shown by arrow A in FIG. 2, the corkscrew motion will cause the container to travel in the direction of arrow B, towards the rear 26 of cooling unit 20 and thus closer to spray jet 44.

The operation of this embodiment of the invention is as follows. Ice is added to reservoir 32 of cooling unit 20, and then water added to reservoir 32. Next, container 10 is placed in cooling unit 20. Can 10 rests on support rings 36 of roller 34 and against ribs 38 projecting from at least one of the side walls of housing 22. Ribs 38 are angled and cause can 10 to sit on roller 34 askew from the axis of the roller by an angle. Finally, the user selects a button from control panel 60 (or an on-off switch) to activate the device. Roller 34 begins to rotate in this embodiment, which causes can 10 to rotate in the opposite direction as depicted by arrow A. The angle of can 10 with respect to the axis of rotation of roller 34 causes can 10 to migrate in the direction of arrow B towards spray jet 44. As can 10 rotates, the impinging water jet from spray jet 44 hits the can and is directed by the rotation of the can to coat the can with a thin film heat transfer layer of constantly replenished water at approximately 0° C. At the same time, agitated fluid within the cans presents an extended surface area to the heat transfer effects of the cooling water. The water thereafter falls off of can 10 and drains into the ice water reservoir 32 so that it may be re-cooled to 0° C. and be re-sprayed onto the container. No special suction cups, chambers, or other holding devices are required to keep the container in place for the requisite rotations. The clear advantage of the simple roller and ribs configuration is that the device may accommodate containers of significantly different geometries and sizes.

One roller may be used to chill two containers on opposite sides (assuming that the dimensions of the containers and the housing allow), and the length of the roller can be increased to accommodate multiple containers at the same time.

As shown in FIGS. 2A and 2B, roller 34 is rotated by motor 44 in a direct drive configuration. It is also possible to use gearing between the motor and the roller, however the unit operates more quietly and fails less often using a direct drive configuration.

The longer a container is rotated and sprayed, the cooler the contents become. Accordingly, control panel settings such as "chilled", "cold", and "ice-cold" may be provided on a control panel as described below to provide the user with an idea of how cold he/she can make the fluid inside the container. As a simpler alternative, a basic on-off switch may be provided instead of a timing switch.

Figure 4:
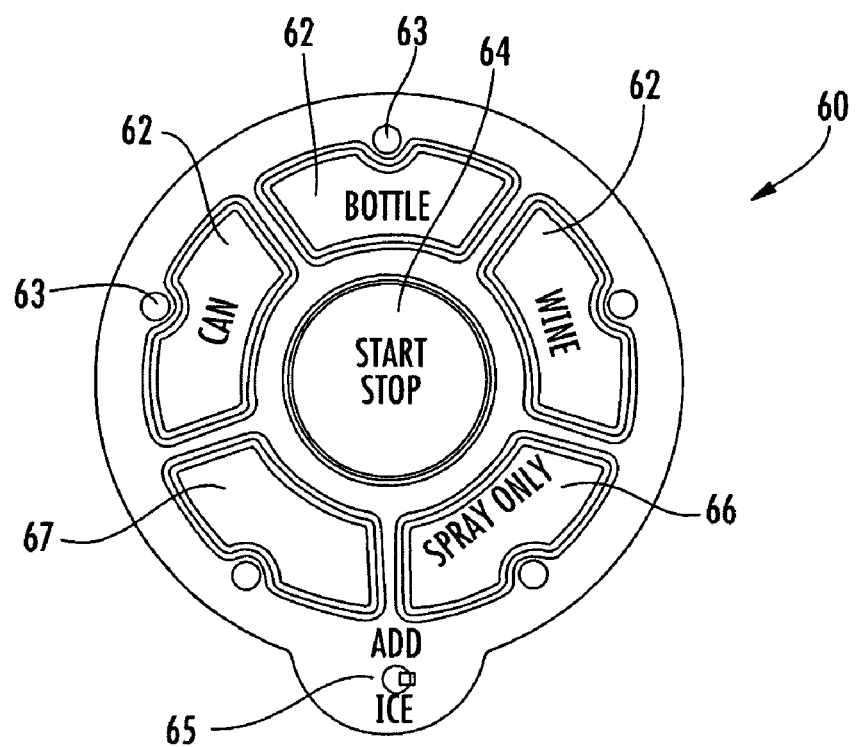
FIG. 4 is a schematic of an embodiment of a control panel for the invention.

One preferred control panel is shown as user interface 60 in FIG. 4. User interface 60 includes several container selector buttons 62 and an on-off button 64. The user determines which container he/she is going to be chilling and depresses the appropriate button 62. The user then presses the start button 64 to begin the chilling cycle. LEDs 63 indicate which chilling cycle has been selected and whether the device is on or off. A computer chip (not shown) or a mechanical timing mechanism (also not shown) may be connected to the container selector buttons 62 which will provide the proper length of chilling cycle for the desired container. In a more advanced embodiment, the selector buttons 62 may also change the volumetric flow rate of the water coming out of the spray jet and/or the speed of rotation of the roller (and thus the speed of rotation of the container); such parameters may be pre-programmed on a computer chip, a programmable logic controller, or the like.

In the preferred interface 60 of FIG. 4, the user is also provided with two additional cooling options. The first is a "spray only" button 66. This feature disables the rotation aspect of the process; roller 34 will not rotate, but spray jet 44 will coat the container with ice-cold water from the reservoir. The "spray only" option allows for the cooling of non-cylindrical containers that would not necessarily rotate smoothly over roller 34. Also, certain carbonated beverages (e.g., Guinness Stout and Murphy's Stout) are sold in containers having a diaphragm built into the container. The agitation of such a container via rotation may cause the product to fizz over when opened. A consumer may wish to chill champagne via the "spray only" method; champagne is notoriously explosive when disturbed or agitated (even though champagne does not explode when rotated, only when it is shaken). A cooling cycle having spraying without rotating will take somewhat longer than a spraying and rotating cooling cycle, however the fluid will still be cooled quicker than by conventional means.

A second feature enabled by user interface 60 is the "extra cold" button 67. By depressing this button in conjunction with any of the container selector buttons 62, the cooling cycle is extended by a predetermined period of time, depending on which container was selected. This will cool the beverage beyond the initial set point of, for example, 5° C. and bring it down to a lower temperature of, for example, 1 or 2° C.

Through use of the cooling unit of the invention, eventually all of the ice will melt and the cooling medium in reservoir 32 will begin to heat up. The user interface may preferably include an indicator 65 which informs the user that the icewater solution is no longer at an optimal temperature. A temperature sensing device, such as a thermocouple, may be disposed in the housing in thermal communication with the reservoir 32. The temperature sensor may be disposed in reservoir 32 or in or near spray jet 44, or anywhere else that is convenient in the cooling medium flow path. When the cooling medium temperature rises above a certain point, for example, 3EC, the "Add Ice/Remove Water" indicator 65 is lighted to inform the user that the solution needs replenishing.

Another feature includes sensing or detecting the temperature of the container itself. This is helpful in determining when a liquid is properly cooled, so that the cooling unit may be deactivated when the set point temperature is reached. A temperature sensor may be provided in or on roller 34 in contact with the container being cooled for a direct contact measurement of the container's temperature, Alternatively, an infrared sensor may be disposed in the interior of housing 22 to visually detect the temperature of the container. An infrared detector might be disposed, for example, on an underside of lid 50 so that it would not be in contact with the cooling medium.

The rapid cooling unit described above is shown as a standalone or tabletop device. As briefly mentioned above, two of the inherent disadvantages of the tabletop version are that it constantly requires its ice supply to be replenished, and it takes up counter top or tabletop space. As such, the inventors have determined that the cooling unit may be incorporated into a refrigerator or freezer as shown in FIGS. 5-13 to thereby take advantage of a source of heat removal (i.e., a source of "cold") already present in almost every home, the refrigerator-freezer or freezer unit. As an example, refrigerator-freezer 100 may be provided with a conventional ice maker 110 recessed in the front of the unit and may be provided with a beverage chiller 120 in accordance with the present invention. As shown in FIG. 5B, chiller 120 includes at least one roller 134 and a spray jet 144, both substantially similar to their respective counterparts described in the aforementioned embodiments. Ribs 138 may be provided corresponding in function (positioning, stabilization, etc.) to ribs 38 described above. However, ribs 138 may be removable from the housing of chiller 120 to fit even larger containers such as champagne or 1-2 liter containers. Ribs 138 may be connected to or integral with a removable wall section 131 that can be snapped into place or removed as the consumer desires. Similarly, removable wall section 131 may not be provided with ribs 138 but instead with a convex or concave wall of the type shown in FIG. 2C. Drain or outlet 132 is provided to allow cooling medium runoff to be collected in other components to be described below.

As illustrated in various embodiments in FIGS. 6-13, the chief components of the inventive system refrigerator-freezer or freezer unit rapid chilling system are the chiller 120 and the cooling medium chilling means. The chilling means preferably includes one or both of reservoir 160 and ice tray 180 in one form or another. Chiller 120 has essentially been described above, in that a container is placed on roller 134 and rotated about an axis while being sprayed by spray jet 144 with a cooling medium such as water. Reservoir 160 is a collection tank for storing cooling medium and maintaining the cooling medium at a usable temperature. Reservoir 160 is preferably at least partially in thermal communication with the freezer compartment so as to keep the cooling medium retained therein cold without freezing it completely solid (although some ice formation is acceptable and, in fact, desirable). Reservoir 160 is preferably provided with port 163, for allowing the system to be filled with cooling medium and/or cleaning solution, and drain 165 for allowing the cooling medium (or cleaning solution) to be removed from the system for cleaning, maintenance, and the like. A sanitizing means 167 is provided in the system, preferably within reservoir 160. Sanitizing means 167 may be an ultraviolet light that kills bacteria that may form in the cooling medium. Alternatively or in addition, sanitizing means 167 may be a device that generates ozone or releases another chemical for the purposes of sanitizing the system. Such a chemical may be released periodically or continuously, depending on design requirements.

Typically, a pump 170 is provided in or near reservoir 160 so as to enable the circulation of the cooling medium between/among the various components of the system. The pump causes the cooling medium to flow so that when the user wishes to cool a beverage in chiller 120, cooling medium showers the beverage container. The pump may also be provided with a recirculating timing mechanism that causes the system to run at predetermined intervals so that the cooling medium does not freeze completely solid in any point of the system and to prevent any particulate matter (which might be picked up from a dirty beverage container, for example) from settling in one place and potentially clogging the system.

The term "ice tray" does not refer to a conventional device for making and storing ice cubes as found in a conventional freezer but to the type of chilling element described hereinbelow and equivalents thereof. The inventive ice tray is an element having one or more chilling surfaces in thermal communication with the freezer compartment (which may be the sole cold compartment of a freezer unit or the colder compartment of a refrigerator-freezer unit). The cooling medium is directed to flow over the chilling surface, upon which the cooling medium is chilled. If the cooling medium is water, ice preferably forms upon the chilling surface(s) of the ice tray. It is here where ice is essentially "stored" for use in the cooling process, instead of having to replenish ice as in the tabletop model. The area of the chilling surface is determined to be great enough so that the system may be used substantially continuously for chilling beverages or other liquids in succession without having to stop to allow the cooling medium to cool off. More specific descriptions of various embodiments of ice trays will be described below.

The three main components, the chiller, the ice tray, and the reservoir, are all in successive communication with one another so that cooling medium exits one component and enters the next component. The invention may be configured with the ice tray between the outlet of the chiller housing and the inlet of the reservoir, or with the ice tray between the outlet of the reservoir and the inlet of the chiller housing, or in any combination or permutation of the three elements. More than one ice tray may be used in the system and may be disposed substantially anywhere in the system.

Description of several specific preferred embodiments follow.

Figure 5A:
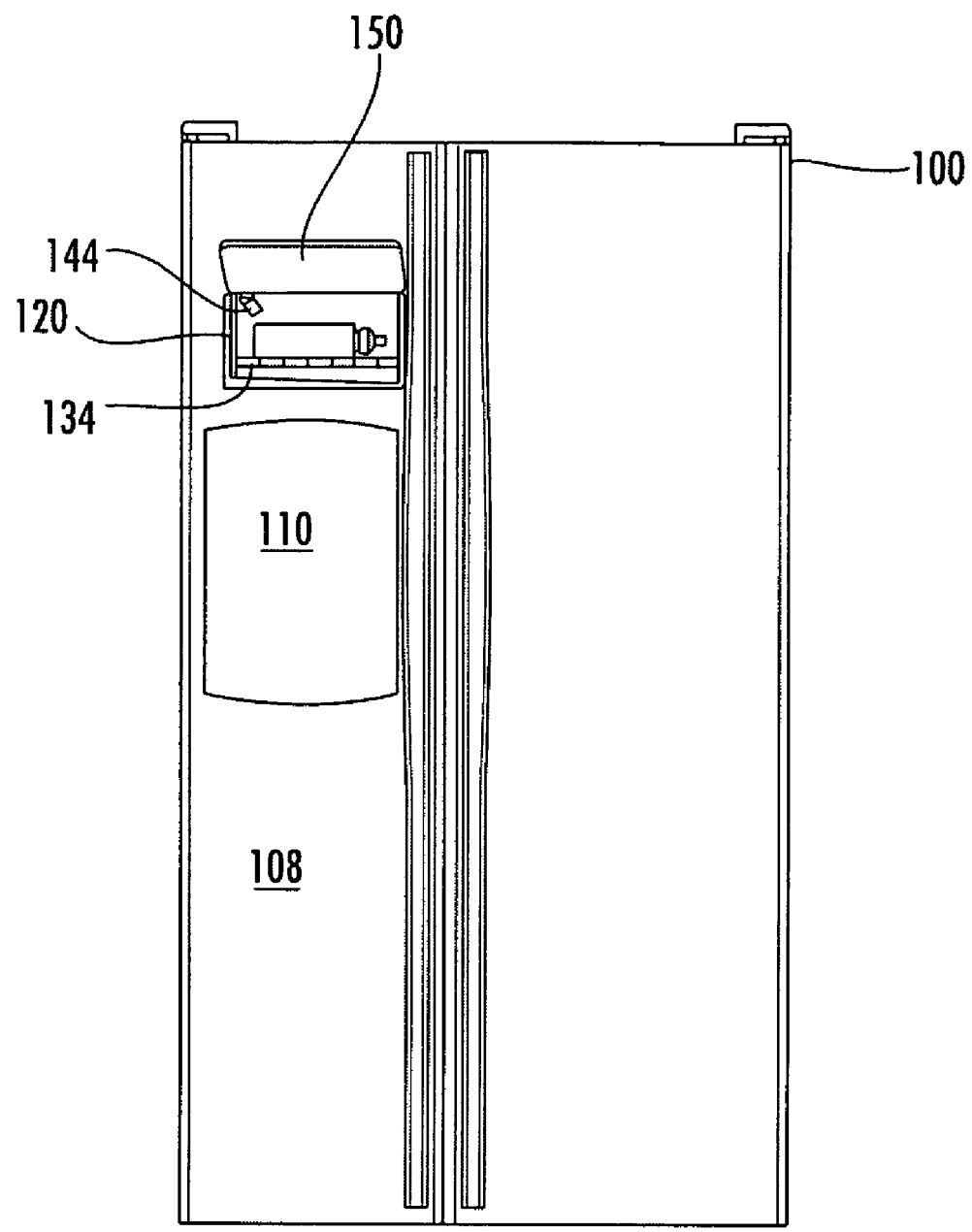
FIGS. 5A-B are schematics of one preferred embodiment of the invention as part of a refrigerator-freezer unit.
Figure 5B:
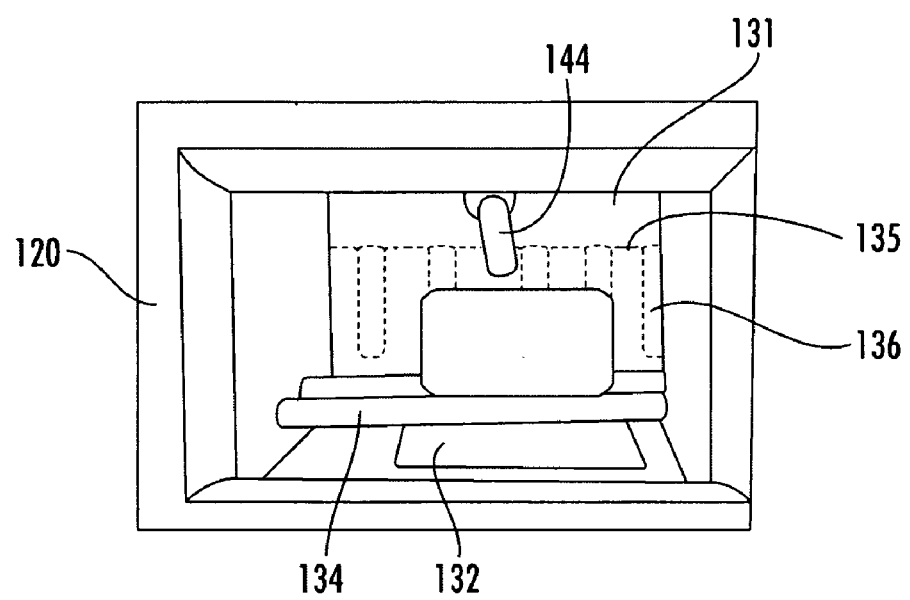
Figure 6A:
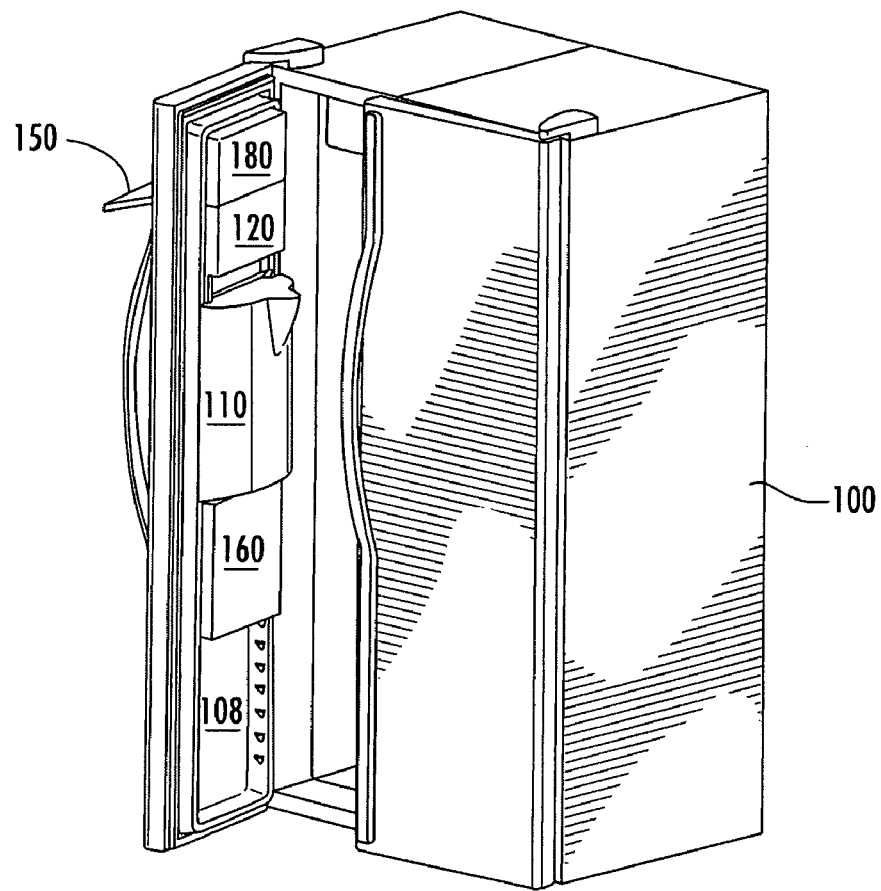
FIGS. 6A-B are perspective schematics of the inside of a door of a refrigerator-freezer in accordance with the invention.
Figure 6B:
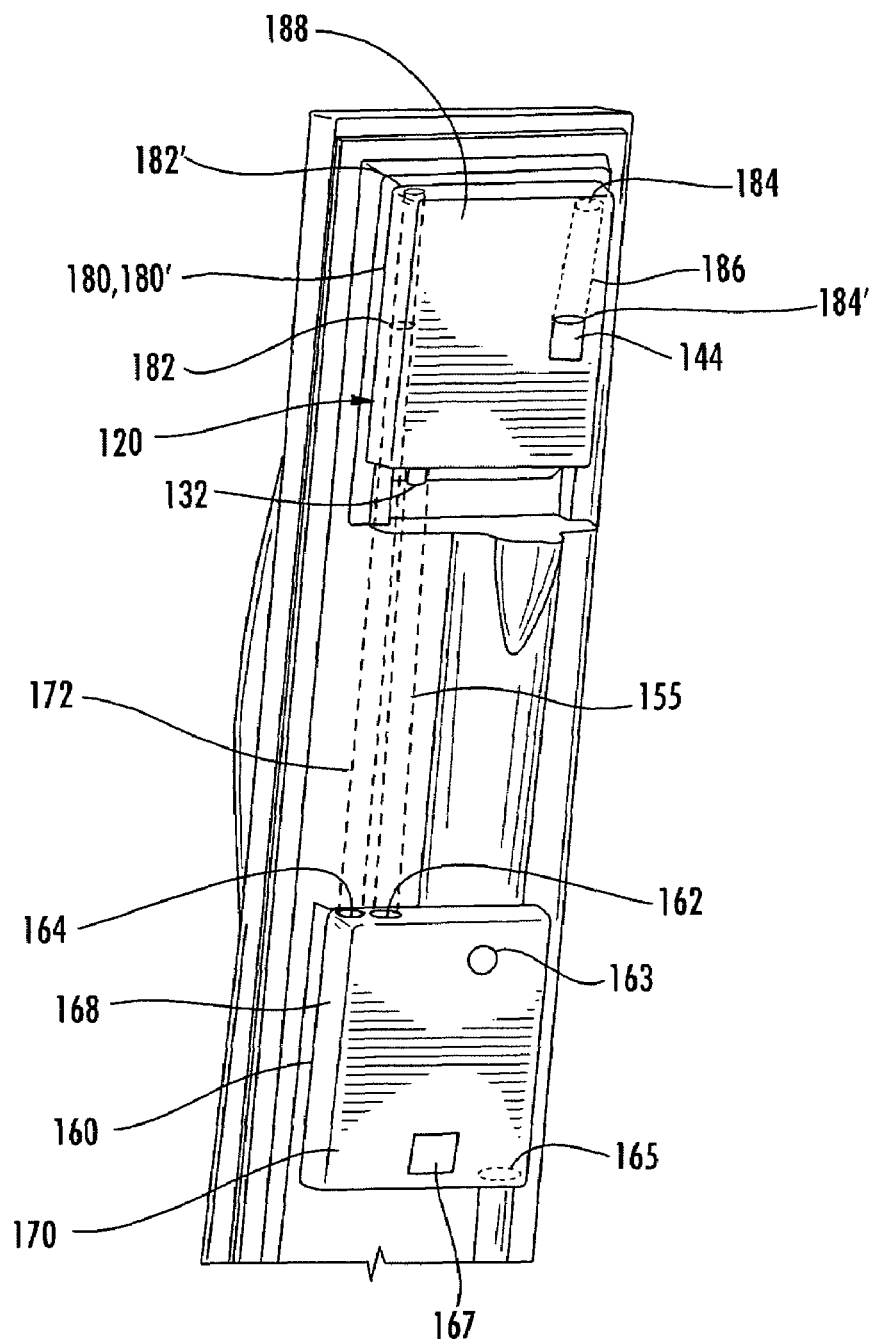
Figure 7:
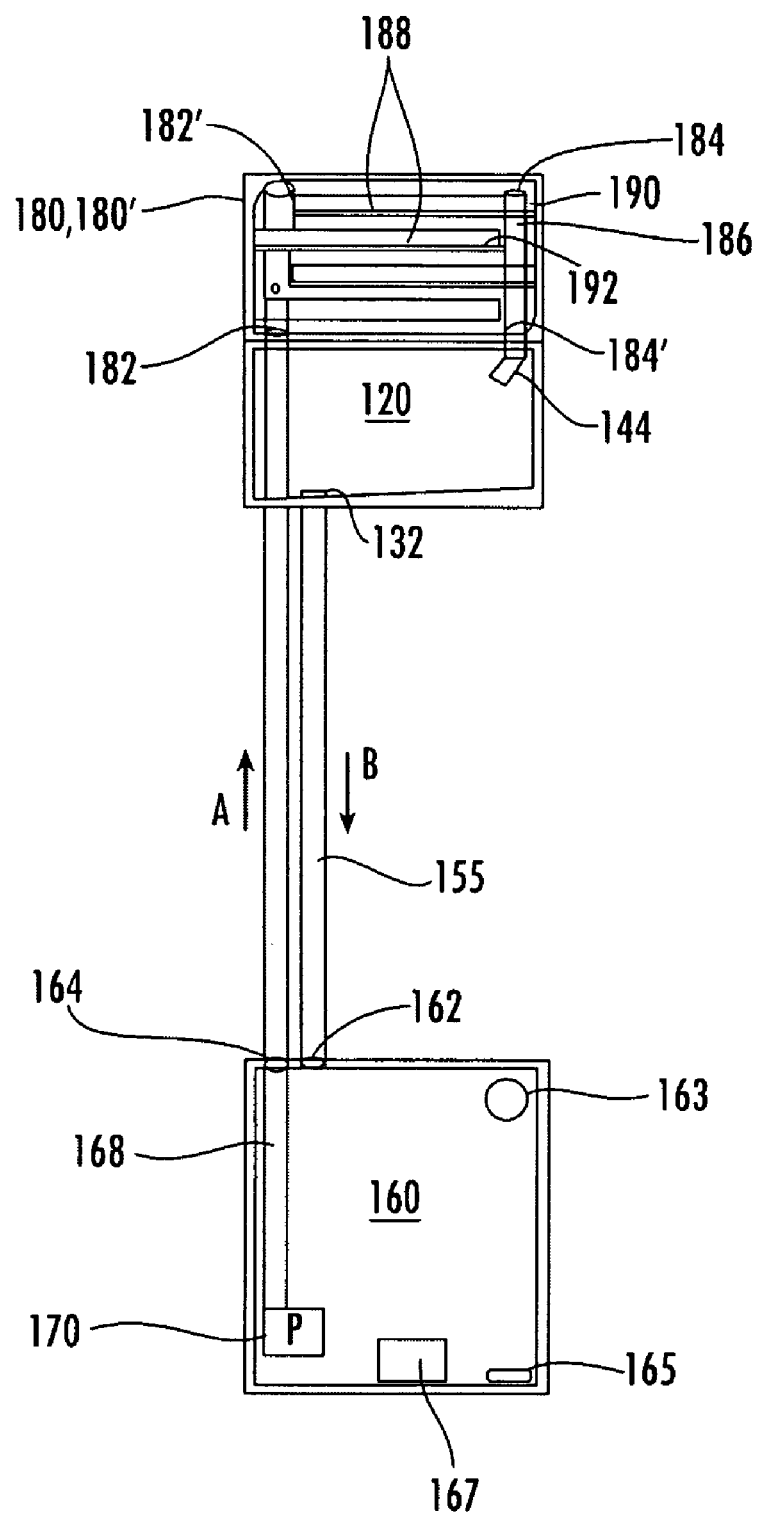
FIG. 7 is a schematic flow diagram of the embodiment of FIG. 6.

One preferred embodiment is shown in FIGS. 5-7 which incorporates the inventive rapid fluid cooling system into a refrigerator-freezer 100. It should be noted that, although refrigerator-freezer 100 is shown to be a "side-by-side" model, it is contemplated that the inventive system may be incorporated into a "top and bottom" refrigerator-freezer unit as well.

In this embodiment, chiller 120 is formed in the door 108 of unit 100. Chiller door 150 is provided to cover chiller 120 during use (e.g., to prevent splashing of the cooling medium) and when not in use (e.g., to insulate the unit better). Door 150 is shown as hinged to be openable to allow access to place or remove a container from within chiller 120, however a sliding door or any other type door may be employed as well. FIG. 6A shows a general broad schematic of this particular embodiment, in which ice tray 180 is disposed atop chiller 120 and reservoir 160 is disposed at the bottom. All three elements are disposed in door 108 of the freezer section of unit 100. Greater detail of this embodiment is shown in FIGS. 6B and 7. In this embodiment, the outlet of ice tray 180 feeds directly into the inlet or spray nozzle 144 of chiller 120, and the outlet 132 of chiller 120 feeds into inlet 162 of reservoir 160 via piping 155.

Figure 10A:
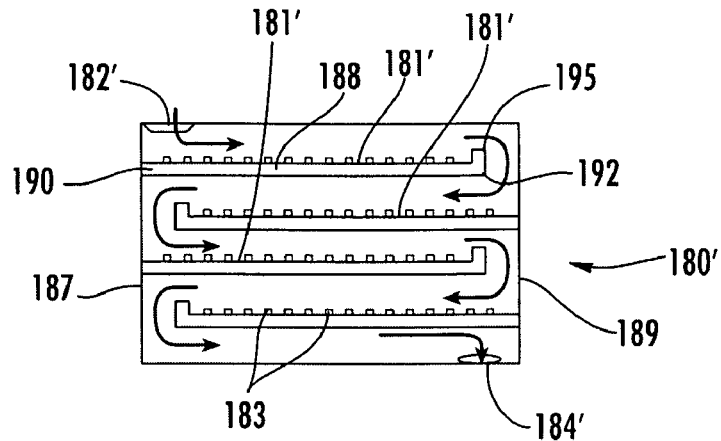
FIGS. 10A-B are side view schematics and FIG. 10C is a top view schematic of ice trays in accordance with the invention.
Figure 10B:
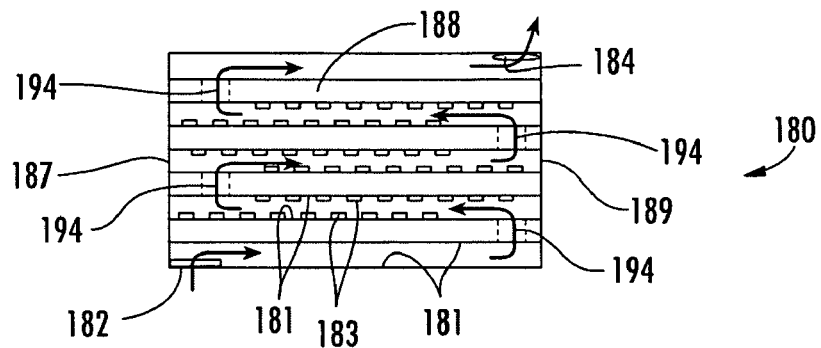
Figure 10C:
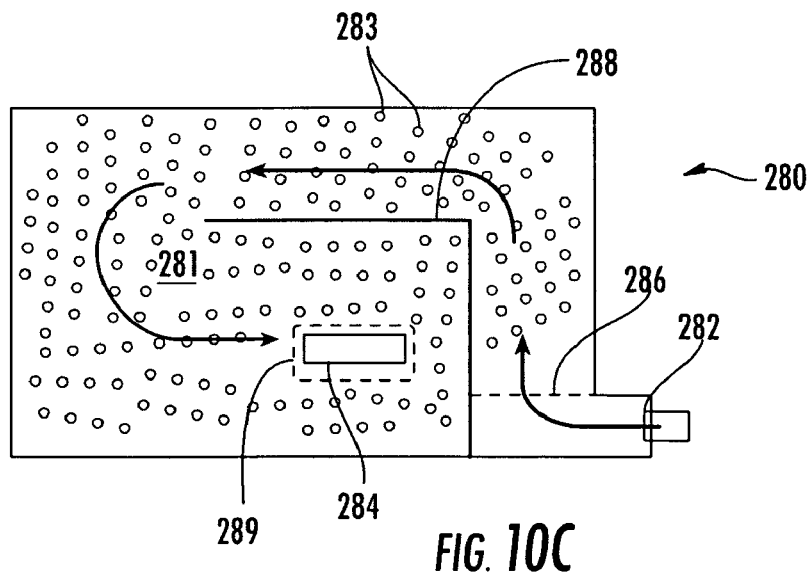
Figure 11:
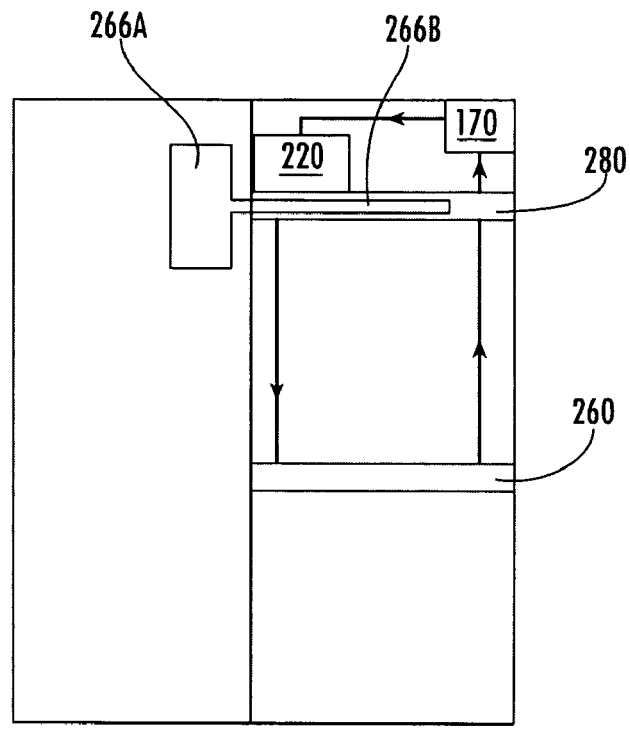
FIG. 11 is a front view schematic of another embodiment of a refrigerator-freezer unit in accordance with the invention.

There are two ways that ice tray 180 may be operated, both of which are shown in FIGS. 6B and 7 and alternatively shown in FIGS. 10A and B (only one way would be employed in a given unit) as ice tray 180 or 180'. In the first configuration shown in FIG. 10B in detail, ice tray 180 has an inlet 182 at its bottom portion and receives pressurized cooling medium from the bottom courtesy of pump 170 and piping 168 in reservoir 160. This embodiment includes at least one and preferably multiple stages 188 attached at least on one end to side walls 187 and 189. Stages 188 may be cantilever (as shown in FIG. 10A) and have a fixed end 190 (attached to a side wall 187 or 189) and a free end 192. Alternatively, stages 188 may each be attached to both side walls 187 and 189 (as shown in FIG. 10B). In this latter arrangement, it would be necessary to provide holes 194 in stages 188 so that the cooling medium may circulate through successive stages 188 of ice tray 180. In any event, in this first configuration, inlet 182 is provided on the bottom of ice tray 180 and receives cooling medium from reservoir 160 via piping 172 (through reservoir outlet 164) in the direction of arrow A (FIG. 7). Each stage 188 has chilling surfaces 181 which, when they come into contact with the cooling medium, reduces the temperature of the cooling medium. Stages 188 are in thermal communication with the freezer compartment of unit 100, either directly or via fins (not shown) or both. As the cooling medium is pumped upwards through successive stages 188 of ice tray 180, the various chilling surfaces 181 (which may also include side walls 187 and 189) chill the cooling medium. When the cooling medium reaches the top stage 188 of ice tray 180, the cooling medium exits ice tray 180 via outlet 184, whereupon it is conducted to spray nozzle 144 of chiller 120 via piping 186. After being used to cool a liquid in a container in chiller 120, the cooling medium drains out of chiller 120 via outlet 132, whereupon it is conducted to reservoir 160 via piping 155 in the direction of arrow B (FIG. 7).

The other version of the ice tray, ice tray 180', is shown in detail in FIG. 10A and also in FIGS. 6B and 7. Stages 188 are provided as above, and again, the stages may be cantilever or fixed at both ends and provided with holes 194. In this embodiment, inlet 182' of ice tray 180' is disposed on the top portion of ice tray 180, and the cooling medium is allowed to cascade down over successive stages 188 via gravity. In this embodiment, should the cantilever design be employed, it is preferred to provide a raised lip 195 at the free end of the stage 188 so that cooling medium may accumulate and pool a bit prior to spilling over lip 195 and down onto the next stage 188. The longer the cooling medium remains on a chilling surface 181', and the more the cooling medium is spread out evenly and thinly over chilling surfaces 181', the more it is cooled, and the more ice will be formed (assuming water or something similar is the cooling medium). Stages 188, be they cantilevered or fixed, may be angled downward towards either their respective free ends 192 or their respective holes 194 so as to insure the cooling medium does not back up and does flow onward to the next successive stage. In any event, in this second gravity-driven configuration, inlet 182' is provided on the top of ice tray 180' and receives cooling medium from reservoir outlet 164 via piping 172 in the direction of arrow A (FIG. 7). Each stage 188 has chilling surfaces 181' which, when they come into contact with the cooling medium, reduce the temperature of the cooling medium. As above, stages 188 are in thermal communication with the freezer compartment of unit 100, either directly or via fins (not shown) or both. As the cooling medium cascades downward over successive stages 188 of ice tray 180', the various chilling surfaces 181' chill the cooling medium. When the cooling medium reaches the bottom stage 188 of ice tray 180', the cooling medium exits ice tray 180 via outlet 184', whereupon it enters spray nozzle 144 of chiller 120. After being used to cool a liquid in a container in chiller 120, the cooling medium drains out of chiller 120 via outlet 132, whereupon it is conducted to reservoir 160 via piping 155 in the direction of avow B (FIG. 7).

In both of the embodiments of FIGS. 10A and 10B, i.e., the pressurized ice trays and the gravity-driven ice trays, small posts or protrusions 183 are preferably provided extending from chilling surfaces 181, 181' for the purpose of creating turbulence in the flow of the cooling medium. Posts 183 may be substantially cylindrical or of other geometric configurations. The distribution of posts 183 shown in FIGS. 10A-B is not representative of and not meant to be limiting as a specific pattern of post distribution contemplated as part of the invention.

Figure 8:
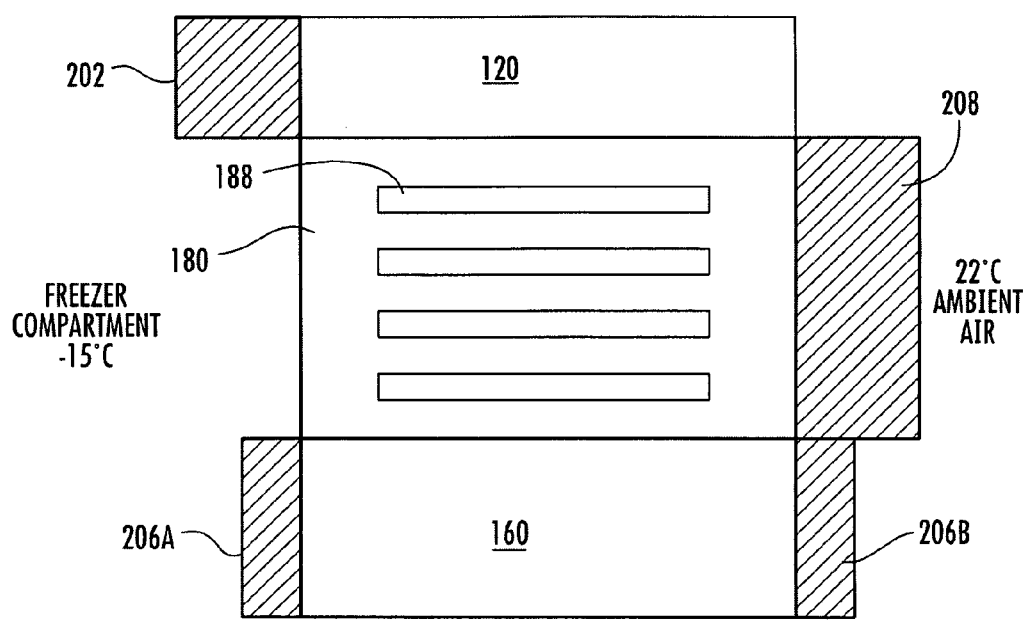
FIG. 8 is a side sectional view of a second embodiment of a freezer unit in accordance with the invention.

FIG. 8 is a side sectional schematic of a chilling system similar to that shown in FIGS. 6 and 7, i.e., freezer door mounted, except that here, chiller 120 is atop ice tray 188, which is in turn atop reservoir 160. This system is well-suited for small freezer units but may be employed in larger units and refrigerator-freezer units as well. The left side of the drawing is the freezer compartment, which is kept at around −15° C., and the right side of the drawing is the outside of the unit, which is ambient air of approximately 22° C. Chiller 120 has a front face exposed to ambient air, i.e., the opening into which a user places the container for rapid chilling. Insulation 202 is provided on the freezer side of the chiller to substantially thermally isolate chiller 120 from the freezer compartment so that heat does not leak into the freezer compartment via chiller 120. Therebelow is provided ice tray 180. Because stages 188 are designed to be in thermal communication with the freezer compartment, no insulation is provided between the freezer compartment and ice tray 180. This allows stages 188 and their respective chilling surfaces to be maintained at −15° C. or thereabouts so that ice may form on the chilling surfaces and so that cooling medium passing over the chilling surfaces is chilled. However, insulation 208 is provided between ice tray 180 and the ambient air to substantially thermally isolate ice tray 180 from the ambient air so that the ice tray remains chilled and heat does not leak into the freezer compartment. Finally, reservoir 160 is provided with insulation 206A between it and the freezer compartment and insulation 206B between it and the ambient air. Insulation sections 206A and B are not so thick that they completely thermally isolate reservoir 160 from either the freezer compartment or the ambient air. Rather, the insulative properties of insulation sections 206A and B are selected so that the reservoir—and the cooling medium therein—is maintained substantially at a desired temperature above freezing. Of course, if a cooling medium with a very low melting point, such as propylene glycol, is used, the temperature of the cooling medium may be allowed to approach that of the freezer compartment and less insulation may be required.

Figure 9:
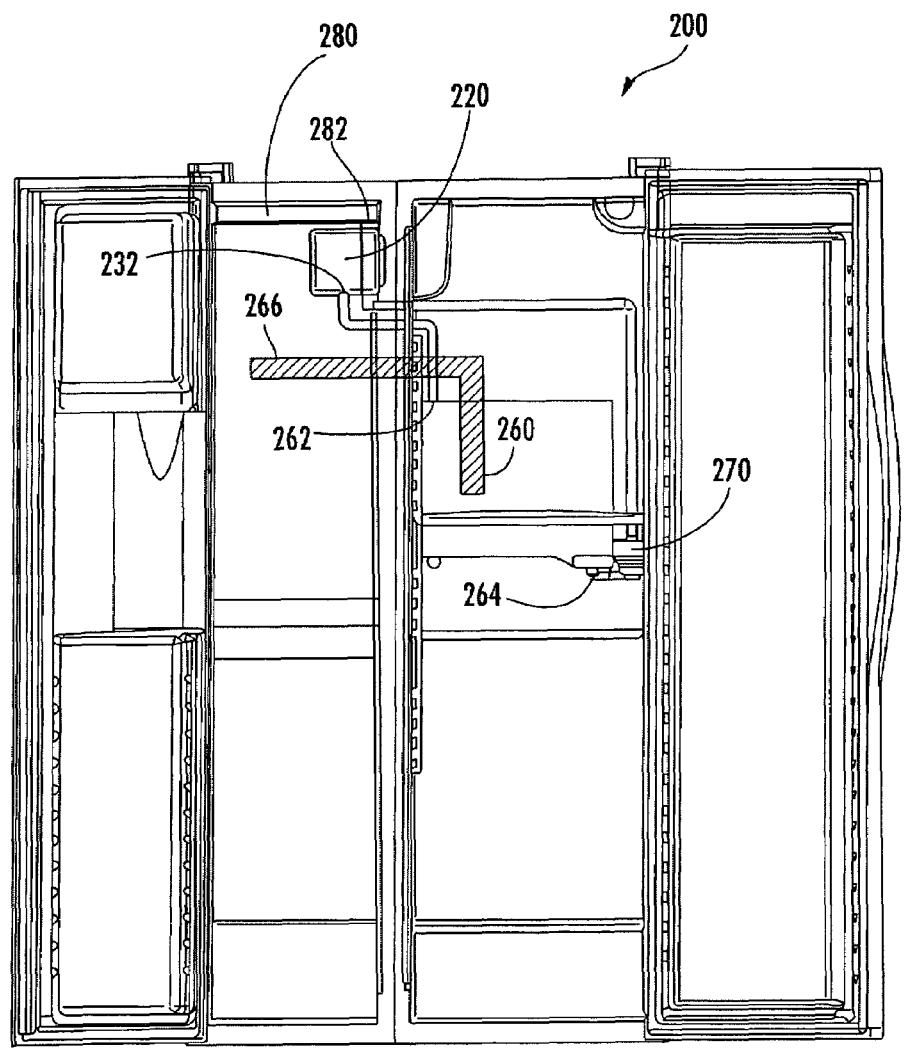
FIG. 9 is a front elevational schematic of an embodiment of a refrigerator-freezer unit in accordance with the invention.

In all of the above embodiments, the components of the inventive chilling system are disposed in the freezer compartment (they may be disposed inside the actual compartment or within the door of a compartment or attached to an inside surface of the door; the door is considered part of the compartment). However, the invention will work equally well with one or more of the components disposed in the warmer refrigerator compartment, albeit with at least part of the system in thermal communication with the colder freezer compartment. FIG. 9 depicts a refrigerator-freezer unit 200 having chiller 220 disposed within the freezer compartment, an ice tray 280 disposed above chiller 220 also in the freezer compartment, and a reservoir 260 disposed in the refrigerator compartment. As above, the cooling medium is pumped out of reservoir outlet 264 via pump 270 into inlet 282 of ice tray 280. From ice tray 280, the cooling medium passes into the chiller 220. Used cooling medium leaves chiller 220 via outlet 232 and is conducted back to inlet 262 of reservoir 260. Reservoir 260 is provided with at least one fin 266 which, at one end, projects into the freezer compartment. In the embodiment shown, fin 266 is an L-shaped flat piece of metal or similar material having good thermal conductivity. Any other practical or effective-shaped fin is contemplated.

Ice tray 280 in this embodiment may be slightly different from those described above. As shown in the top view schematic of FIG. 10C, ice tray 280 is a single-stage broad element. Cooling medium enters via inlet 282 and passes over a partial barrier or lip 286. Lip 286 is provided to prevent back flow of the cooling medium and to encourage ice growth. Internal baffles 288 are walls that are the full height or thickness of ice tray 280, and they conduct the flow of the cooling medium to insure the cooling medium spreads over the entire chilling surface 281 of ice tray 280. Posts 283 protrude from chilling surface 281 serve to create or enhance turbulence in the flow of the cooling medium and to increase the rate of heat transfer across the chilling surface. Outlet 284 is at least partially (and preferably, completely) surrounded by a partial barrier or lip 289. The provision of lips 286 and 289 insures that the cooling medium lingers over the chilling surface for as long as possible and enable ice to form in the ice tray. This type of ice tray 280 may also be provided in stages.

As mentioned above, other combinations of the main components are possible. For example, in FIG. 11, chiller 220, ice tray 280, and reservoir are all disposed in the refrigerator compartment. Here, both ice tray 280 and reservoir 260 are flat and can serve as shelves for the user to place items upon, i.e., food. In this embodiment, ice tray 280 is provided with a fin 266A, having a large surface area, in the freezer compartment, and a rod 266B attached thereto and projecting into the ice tray. Reservoir 260 may also be provided with a fin (not shown).

Figure 12:
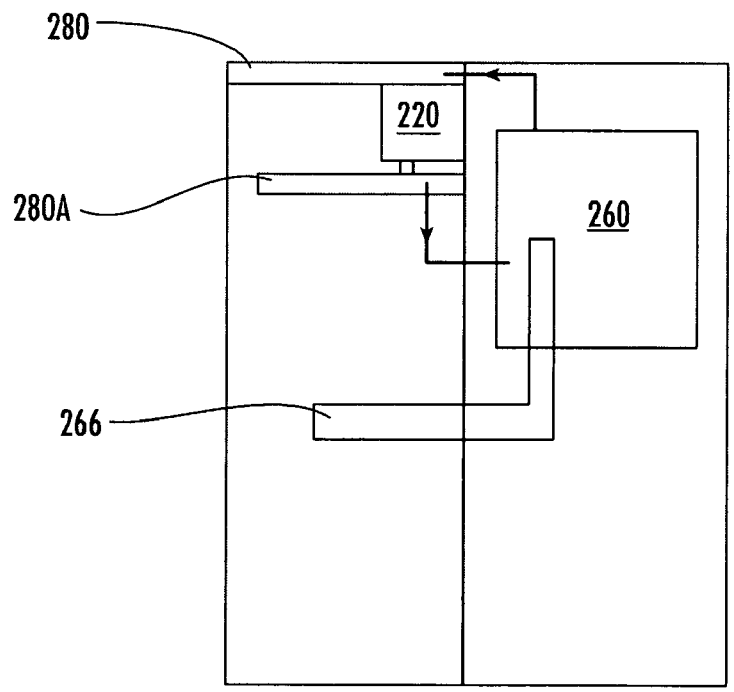
FIG. 12 is a front view schematic of yet another embodiment of a refrigerator-freezer unit in accordance with the invention.

Another combination is shown in FIG. 12. Here, ice tray 280 is provided above chiller 220, and a supplemental ice tray 280A is provided below chiller 220. Supplemental ice tray 280A feeds into reservoir 260. The primary ice tray 280 may be disposed either above or below chiller 220, and the supplemental ice tray is optionally provided also either above or below chiller 220, or anywhere in the cooling medium circuit.

Figure 13:
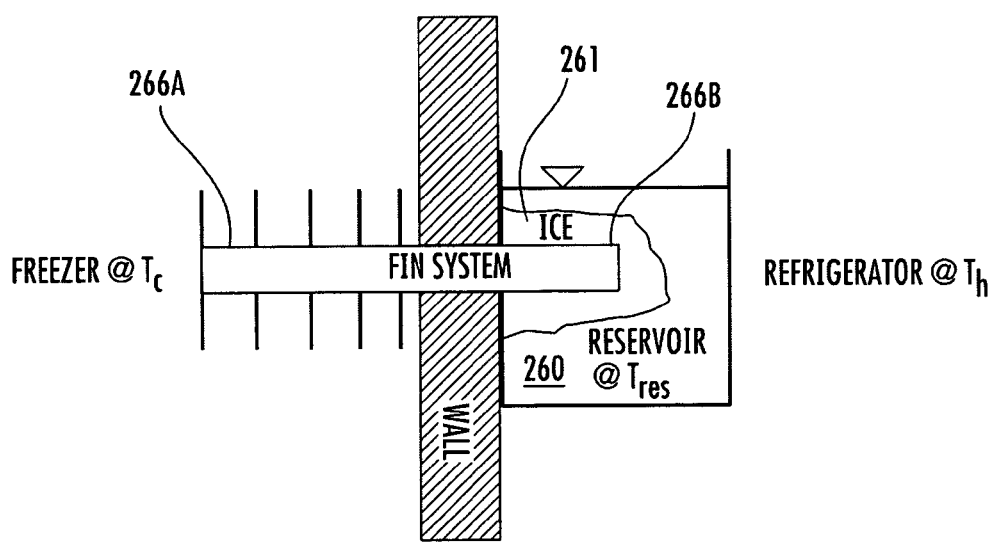
FIG. 13 is a side view schematic of a reservoir in accordance with the invention.

As mentioned above, the inventive system may be used without ice trays altogether. FIG. 13 depicts a portion of such a system. Reservoir 260 is connected thermally to the freezer compartment by a fin system that passes through the compartment wall. Specifically, the fin system has a number of fins 266A disposed in the freezer compartment and a rod 266B projecting into reservoir 260. Ice 261 forms around rod 266B. The transient growth rate of ice is constrained by the convective heat transfer between the air and the system (both refrigerator and freezer). On the other hand, there is a great degree of control of the total quantity of ice that can form at steady state by suitable design choices. To maximize the amount of ice formed, an effective fin system (perhaps coupled with an active fan to enhance heat transfer rate) on the freezer side is needed, while reservoir 260 should be insulated somewhat on the refrigerator side.

Desired use patterns of the system may be defined in terms of total beverages per day and/or the requirements for continuous chilling. The total amount of ice formed at steady-state provides a means for storing an energy sink during active chilling. Approximately 100 grams (0.1 liters) of ice is needed to chill a standard 12 oz. beverage. If, for example, it is required that 10 beverages be chilled in succession before the ice is consumed, then the system must form approximately 1 kg (1 liter) of ice at steady state. The active load of chilling is approximately 500 watts for canned beverages. For continuous chilling, ice must be formed at the same energy equivalent rate, and heat must be transferred from the freezer fins to the freezer air at the same rate, or an ice surface area must be provided that can absorb 500 watts of heat and provide enough mass of ice to be able to handle the desired quantity of beverages.

The invention is not limited to the above description. For example, the invention describes the container as being placed horizontally within the housing of the device. However, the container may be placeable at an angle to the horizontal and still be within the scope of the invention. One way this could be accomplished is by the angling of the roller away from the horizontal. The container may be at an angle of as much as 45° and still be within the scope of the invention. The angling of the container allows for certain open containers to be chilled with the inventive process, e.g., open bottles of wine. It would be recommended that the bottle be recorked prior to chilling, however recorking may not be required. The pump and motor are electrically interconnected with a computer controller which is preprogrammed with time parameters for cooling of the cans based on the desired temperature, can material and size of the can, with information entered via a keyboard. In other embodiments, such parameters can be readily written into EPROM for dedicated microprocessor control. At the appropriate cooling time, the pumps and motor stop and the beverage cans can then be removed from the device.

The cooling medium to be used in the invention is not limited to water. Other fluids such as propylene glycol, alcohol, and the like, as well as chilled gases, may be employed. In another variation, water may be used with a solute that could both depress the freezing point of the water and sanitize or sterilize the water, e.g., an ethanol/water mixture, water with calcium chloride, etc. The cooling medium may work in conjunction with sanitizing means 167 described above. Similarly, the materials out of which the components of the system may be made can be virtually any material exhibiting adequate thermal properties that will be non-reactive to the cooling medium selected. It is preferred that the ice trays of varying designs described above and their equivalents have at least their chilling surfaces made from metal having good to excellent thermal conductivity. Indeed, the entire ice tray may be made from such metal.

Having described the invention with regard to specific embodiments, it is to be understood that the above description is not meant as a limitation excluding such further variations or modifications as may be apparent or may suggest themselves to those skilled in the art. The invention is defined by the claims appearing hereinbelow.

What is claimed is:

1. Apparatus for rapidly cooling a liquid in a container in a freezer, comprising:

a housing having a bottom and side walls defining an interior volume adapted to receive a container of liquid and a housing outlet;

a rotating mechanism disposed in said housing adapted to rotate the container about the container's longitudinal axis;

a source of a liquid cooling medium to cool the container; and at least one ice tray for chilling the liquid cooling medium, said at least one ice tray having an inlet receiving the cooling medium, a substantially planar chilling surface in thermal communication with the freezer compartment and receiving the cooling medium from said inlet, and an outlet allowing the cooling medium to exit said ice tray;

a reservoir, adapted to collect said liquid cooling medium, having a reservoir inlet and a reservoir outlet, said reservoir inlet in communication with one of said housing outlet and said ice tray outlet; and at least one fin having a first end in contact with said reservoir and a second end in contact with the freezer compartment, said fin passing through a wall of the freezer compartment and conducting heat from said liquid cooling medium in said reservoir to the freezer compartment, wherein said liquid cooling medium flows over said chilling surface and is cooled thereby, and wherein when the container is placed within said interior volume, the liquid cooling medium thermally communicates with the container while said rotating mechanism rotates the container.

2. Apparatus for rapidly cooling a liquid according to claim 1, said reservoir inlet communicating with said ice tray outlet and said reservoir outlet communicating to said cooling medium source, wherein said housing empties the liquid cooling medium into said ice tray inlet.

3. Apparatus for rapidly cooling a liquid according to claim 2, further comprising a section of insulation having a first part partially insulating said reservoir from the freezer compartment and a second part partially insulating said reservoir from ambient air, wherein said first and second parts of said section of insulation are adapted to keep said reservoir substantially as cold as possible without completely freezing the cooling medium.

4. Apparatus for rapidly cooling a liquid according to claim 2, further comprising:
a first section of insulation substantially completely insulating said housing from the freezer compartment;
a second section of insulation substantially completely insulating said ice tray from ambient air; and
a third section of insulation having a first part partially insulating said reservoir from the freezer compartment and a second part partially insulating said reservoir from ambient air,
wherein said first and second parts of said third section of insulation are adapted to keep said reservoir substantially as cold as possible without completely freezing the cooling medium.

5. Apparatus for rapidly cooling a liquid according to claim 1, wherein said side walls of said housing further comprise selectively removable portions to accommodate additional containers of different sizes.

6. Apparatus for rapidly cooling a liquid according to claim 1, further comprising:
a recirculator for recirculating the cooling medium throughout said apparatus; and
a recirculation timing mechanism for activating said recirculator at least at times other than when requested by a user for cooling a liquid.

7. A domestic freezer, comprising:
a freezer compartment for storing food in communication with a compressor for lowering the temperature of the air in said freezer compartment;
a housing disposed within said freezer compartment having a bottom and side walls defining an interior volume adapted to receive a container of liquid and a housing outlet;
a rotating mechanism disposed in said housing adapted to rotate the container within said housing;
a source of a liquid cooling medium to cool the container;
at least one ice tray for chilling said cooling medium, said at least one ice tray having an inlet receiving said cooling medium, a substantially planar chilling surface in thermal communication with said freezer compartment and receiving said cooling medium from said inlet, and an outlet allowing said cooling medium to exit said ice tray; and
a reservoir, adapted to collect said liquid cooling medium, having a reservoir inlet and a reservoir outlet, said reservoir inlet in communication with one of said housing outlet and said ice tray outlet; and
at least one fin having a first end in contact with said reservoir and a second end in contact with the freezer compartment, said fin passing through a wall of the freezer compartment and conducting heat from said liquid cooling medium in said reservoir to the freezer compartment,
wherein said liquid cooling medium flows over said chilling surface and is cooled thereby, and
wherein when the container is placed within said interior volume, said liquid cooling medium thermally communicates with the container while said rotating mechanism rotates the container.

8. A domestic freezer according to claim 7, said reservoir inlet communicating with said ice tray outlet and a said reservoir outlet communicating to said cooling medium source, wherein said housing empties the liquid cooling medium into said ice tray inlet.

9. A domestic freezer according to claim 8, further comprising:
a first section of insulation substantially completely insulating said housing from said freezer compartment;
a second section of insulation substantially completely insulating said ice tray from ambient air; and
a third section of insulation having a first part partially insulating said reservoir from said freezer compartment and a second part partially insulating said reservoir from ambient air,
wherein said first and second parts of said third section of insulation are adapted to keep said reservoir substantially as cold as possible without completely freezing the cooling medium.

10. A domestic freezer according to claim 7, further comprising a plurality of posts protruding from said chilling surface for creating turbulence in said liquid cooling medium as said liquid cooling medium flows thereby.

11. A domestic freezer according to claim 7, wherein said cooling medium comprises water plus a solute that lowers the freezing point of the water, or sterilizes the water, or both.

12. A domestic freezer according to claim 8, wherein said freezer is part of a domestic refrigerator-freezer having at least two cooling compartments, including said freezer compartment being colder than the other warmer refrigerator compartment, and wherein said chilling surface is in thermal communication with the colder freezer compartment and is adapted to chill the liquid cooling medium; and
wherein said reservoir is disposed in either compartment and in thermal communication with the colder compartment.

13. Apparatus according to claim 12, said ice tray being covered and comprising a shelf in the compartment in which said ice tray is disposed upon which items may be placed.

14. Apparatus according to claim 12, said ice tray further comprising baffles, projecting from said chilling surface, adapted to direct flow of the liquid cooling medium across said chilling surface.

15. Apparatus according to claim 14, wherein said baffles direct the liquid cooling medium to spread substantially over said chilling surface before draining out of said ice tray via said ice tray outlet.

16. Apparatus according to claim 12, wherein said housing is disposed in the colder freezer compartment and has a housing outlet;
wherein said ice tray is disposed in the colder compartment, said ice tray outlet being in communication with either i) said cooling medium source in said housing or ii) a said reservoir inlet; and said ice tray inlet being in communication with either i) said reservoir outlet or ii) said housing outlet.

17. Apparatus according to claim 16, further comprising a supplemental ice tray disposed either i) between said housing outlet and said reservoir inlet or ii) between said reservoir outlet and said cooling medium source in said housing.

18. Apparatus for rapidly cooling a liquid in a container, comprising:
a housing having a bottom and side walls defining an interior volume and a housing outlet, said housing being part of a domestic refrigerator;
a rotating mechanism having a longitudinal axis disposed in said housing adapted to rotate the container about the container's longitudinal axis;
a source of a thin film of a liquid cooling medium to cool the container;

a reservoir, adapted to collect said liquid cooling medium, having a reservoir inlet and a reservoir outlet, said reservoir inlet in communication with one of said housing outlet and said ice tray outlet; and at least one fin having a first end in contact with said reservoir and a second end in contact with a freezer compartment of the domestic refrigerator, said fin passing through a wall of the freezer compartment and conducting heat from said liquid cooling medium in said reservoir to the freezer compartment, wherein when the container is placed within said interior volume, the thin film of cooling medium thermally communicates with the container while said rotating mechanism rotates the container.

19. A refrigerator-freezer, comprising:

a freezer compartment and a refrigerator compartment, said freezer compartment being colder than said refrigerator compartment, said compartments in communication with a compressor for lowering the air temperature of said compartments;

a housing having an interior volume adapted to receive a container, said housing being disposed in one of said compartments;

a rotating mechanism disposed in said housing adapted to rotate the container placed in said housing substantially about the container's longitudinal axis;

a source of a liquid cooling medium to cool the container in said housing;

a reservoir disposed in one of said compartments and in thermal communication with said freezer compartment adapted to collect said liquid cooling medium and substantially maintain said cooling medium at a given temperature, said reservoir including at least one fin having a first end in contact with said reservoir and a second end in contact with said freezer compartment, said fin passing through a wall of said reservoir and conducting heat from said liquid cooling medium in said reservoir to the freezer compartment, and wherein said liquid cooling medium recirculates between said reservoir and said housing.

* * * * *